United States Patent
Britz et al.

(10) Patent No.: US 6,731,878 B1
(45) Date of Patent: May 4, 2004

(54) FREE SPACE OPTICAL COMMUNICATION LINK WITH DIVERSITY

(75) Inventors: David M. Britz, Rumson, NJ (US); Jeevan Prakash Dodley, Parsippany, NJ (US); Robert R. Miller, Convent Station, NJ (US)

(73) Assignee: AT&T Corp, New York, NY (US)

( * ) Notice: Subject to any disclaimer, the term of this patent is extended or adjusted under 35 U.S.C. 154(b) by 487 days.

(21) Appl. No.: 09/640,576

(22) Filed: Aug. 17, 2000

(51) Int. Cl.[7] .............................................. H04J 14/02
(52) U.S. Cl. ............................ 398/96; 398/91; 398/118
(58) Field of Search .......................... 398/96, 91, 79, 398/118, 130, 102, 115, 161; 250/227.12

(56) References Cited

U.S. PATENT DOCUMENTS

| | | | |
|---|---|---|---|
| 3,504,182 A | 3/1970 | Pizzuro et al. | |
| 3,511,998 A | 5/1970 | Smokler | |
| 4,559,625 A | 12/1985 | Berlekamp et al. | 371/2 |
| 4,677,618 A | 6/1987 | Haas et al. | 371/1 |
| 4,797,951 A | 1/1989 | Duxbury et al. | 455/608 |
| 4,823,402 A | 4/1989 | Brooks | 455/607 |
| 4,901,319 A | 2/1990 | Ross | 371/45 |
| 4,918,689 A | 4/1990 | Hui | 370/859 |
| 5,157,530 A | 10/1992 | Loeb et al. | 359/124 |
| 5,301,209 A | 4/1994 | Wei | 375/39 |
| 5,475,520 A * | 12/1995 | Wissinger | 398/118 |
| 5,703,708 A * | 12/1997 | Das et al. | 398/102 |
| 5,717,689 A | 2/1998 | Ayanoglu | 370/349 |
| 5,777,768 A | 7/1998 | Korevaar | 359/172 |
| 5,784,184 A | 7/1998 | Alexander et al. | 359/125 |
| 5,786,913 A * | 7/1998 | Pfeiffer | 398/59 |
| 5,822,100 A | 10/1998 | Robinson et al. | 359/161 |
| 5,838,728 A | 11/1998 | Alamouti et al. | 375/265 |
| 5,852,614 A | 12/1998 | Stephens et al. | 371/2.1 |
| 5,946,118 A | 8/1999 | Flaherty | 359/124 |
| 5,996,104 A | 11/1999 | Herzberg | 714/755 |
| 6,003,147 A | 12/1999 | Stephens et al. | 714/701 |
| 6,016,212 A * | 1/2000 | Durant et al. | 398/131 |
| 6,341,023 B1 * | 1/2002 | Puc | 398/79 |
| 6,433,904 B1 * | 8/2002 | Swanson et al. | 398/91 |

OTHER PUBLICATIONS

F. M. Davidson et al., "Interleaved Convolutional Coding For The Turbulent Atmospheric Optical Communication Channel", IEEE Transactions on Communications, vol. 36, No. 9, Sep. 1988, pp. 993–1003.

F. M. Davidson et al., "Interleaved Concatenated Coding For The Turbulent Atmospheric Direct Detection Optical Communication Channel", IEEE Transactions on Communications, vol. 37, No. 6, Jun. 1989, pp. 648–651.

K. E. Wilson et al., "Multiple–Beam Transmission For Optical Communication", NASA Tech Brief, vol. 22, No. 11, Nov. 1998, 2 pages.

* cited by examiner

Primary Examiner—Kinfe-Michael Negash

(57) ABSTRACT

A free space communication system includes first and second terminals, and the first terminal includes a transmitter to transmit an input signal. The transmitter has plural laser sources, at least one optical delay line and a telescope. Each laser source modulates the input signal onto a wavelength that is distinct from a wavelength of each other laser source. The plural laser sources include a first laser source and at least one other laser source, and the at least one optical delay line is coupled to a respective output of the at least one other laser source. The telescope projects an output of the first laser source and an output of each of the at least one optical delay line toward the second terminal. Alternatively, a free space communication system includes first and second terminals, and the first terminal includes a transmitter to transmit an input signal. The transmitter has at least one electrical delay line, plural laser sources and a telescope. The at least one electrical delay line delays the input signal. The plural laser sources include a first laser source and at least one other laser source, the first laser source modulates the input signal onto a first wavelength, and each of the at least one other laser source modulates an output of a corresponding electrical delay line onto a wavelength that is distinct from the first wavelength. The telescope projects an output of each of the plural laser sources toward the second terminal.

12 Claims, 5 Drawing Sheets

150

FREE SPACE OPTICAL COMMUNICATION LINK WITH DIVERSITY

BACKGROUND OF THE INVENTION

1. Field of the Invention

The present invention relates to a free space optical communication link and, in particular, the invention relates to techniques to spread error sources over time intervals and provide redundant channels to reduce the effects of fading.

2. Description Of Related Art

Known optical communication systems rely on optical fibers between transmitter and receiver. However, to establish a system network requires obtaining right of ways and installation of fiber, a time consuming and expensive process.

Free space optical communication systems are fundamentally different than fiber optic systems. Distances are more limited. The media is air and subject to atmospheric disturbances such as fog, rain and resulting fades.

Koh and Davidson ("Interleaved Concatenated Coding For The Turbulent Atmospheric Direct Detection Optical Communication Channel", *IEEE Transactions On Communications,* Vol. 37, No. 6, June 1989, pages 648–651) discuss how the direct detection atmospheric optical communication channel is characterized by strong fading of the received laser light intensity caused by random variations in the index of refraction encountered by laser light variations as it propagates through the channel.

In addition, the Jet Propulsion Laboratory of the California Institute of Technology published a "Technical Support Package on Multiple-Beam Transmission For Optical Communication" in November 1998 as NASA Tech Brief, Vol. 22, No. 11 from a JPL New Technology Report NPO-20384. This NASA Tech Brief describes how superposition of mutually incoherent beams would reduce deleterious effects of atmospheric turbulence.

SUMMARY OF THE INVENTION

It is an object to the present invention to provide a free space optical communication link that reduces the effects of fading.

This and other objects are achieved in a free space communication system that includes first and second terminals, and the first terminal includes a transmitter to transmit an input signal. The transmitter has plural laser sources, at least one optical delay line and a telescope. Each laser source modulates the input signal onto a wavelength that is distinct from a wavelength of each other laser source. The plural laser sources include a first laser source and at least one other laser source; and the at least one optical delay line is coupled to a respective output of the at least one other laser source. The telescope projects an output of the first laser source and an output of each of the at least one optical delay line toward the second terminal.

In an alternative embodiment, this and other objects are achieved in a free space communication system that includes first and second terminals, the first terminal including a transmitter to transmit an input signal. The transmitter has at least one electrical delay line, plural laser sources and a telescope. The at least one electrical delay line delays the input signal. The plural laser sources include a first laser source and at least one other laser source; the first laser source modulates the input signal onto a first wavelength, and each of the at least one other laser source modulates an output of a corresponding electrical delay line onto a wavelength that is distinct from the first wavelength. The telescope projects an output of each of the plural laser sources toward the second terminal.

The receiver includes diversity reception means to optimally combine the received signals.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
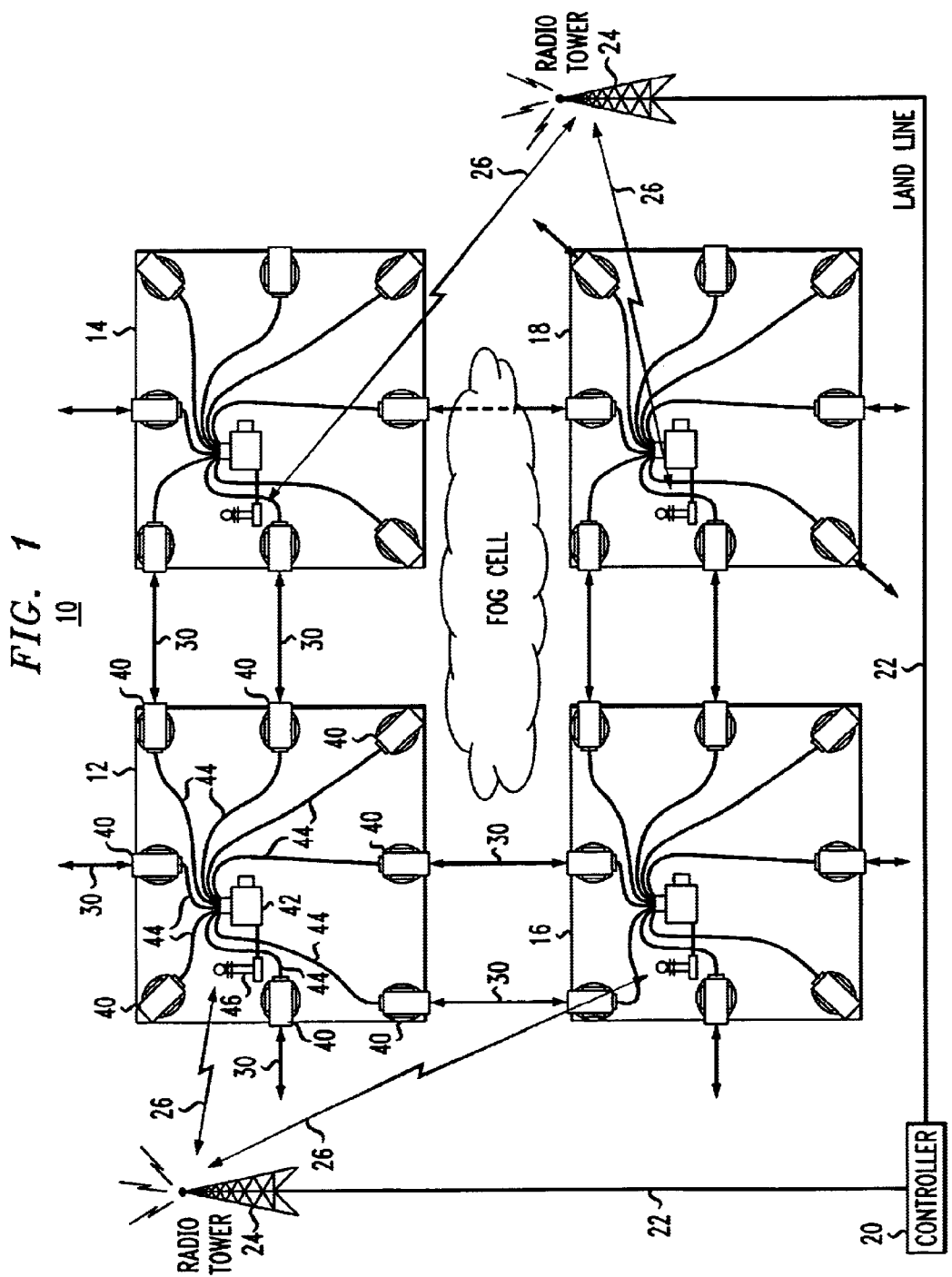
FIG. 1 is a schematic of an optical communication system incorporating the present invention.

In FIG. 1, communication system 10 includes a plurality of nodes, depicted as nodes 12, 14, 16 and 18, that may be located on the tops of tall buildings in metropolitan areas and on towers elsewhere. Each node is coupled to a network control system that includes central controller 20, land lines 22 and one or more radio towers 24. Radio towers 24 communicate with the nodes over wireless links 26. The control system may advantageously include a typical cellular telephone system, controller 20 (located at a convenient location) and cell phone transceiver 46 at each node to direct the operation of communication system 10.

The nodes are configured into a network by a plurality of point-to-point links of which link 30 is typical. Each link, as depicted by link 30, includes a bidirectional (e.g., duplex) free space optical channel. However, in any single link, there may be only a unidirectional channel.

Each node includes at least one outdoor unit 40 (hereinafter ODU), and typically a plurality of ODUs. For example, eight ODUs 40 are depicted in FIG. 1 on the top of a building at node 12. Each ODU is coupled to switch circuit 42 through respective cables 44. Each ODU couples free space optical signals received over link 30 into cable 44, and propagates optical signals in a fiber in cable 44 as free space optical signals over link 30. Switch circuit 42 is controlled by controller 20 through cell phone transceiver 46. Typically switch circuit 42 and cell phone transceiver 46 are part of an indoor unit (IDU).

The free space optical channel (hereinafter FSOC) can transmit at a super high bandwidth that no other wireless technology can offer. However, the FSOC is subject to transmission beam fades due to atmospheric turbulence. Some or all of the transmission beam fades can be reduced by use of delay and diversity techniques which include redundant transmission beams and wavelengths within the optical or electrical path through a free space optical communication system to overcome transmission errors due to atmospheric fade.

Figure 2:
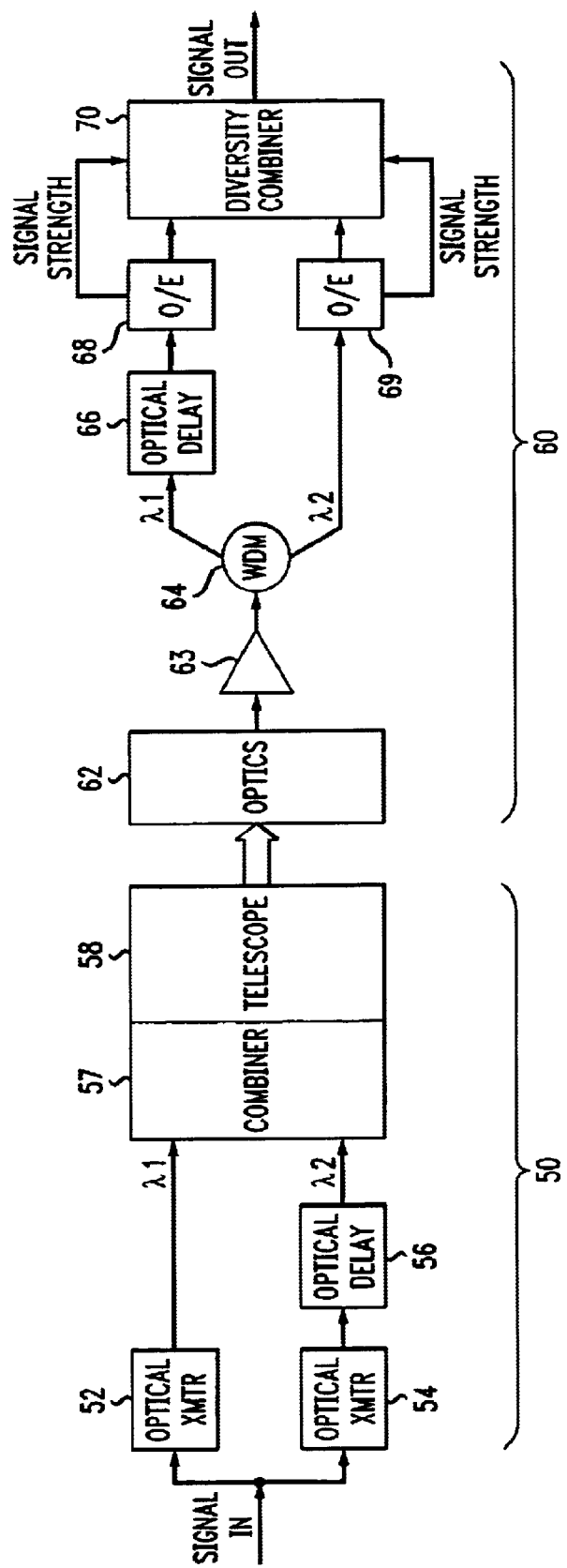
FIG. 2 is a block diagram of a first embodiment of the present invention.

In FIG. 2, a free space optical channel (as in link 30 of FIG. 1) includes transmitter 50 and receiver 60. Transmitter 50 includes first optical transmitter 52 and second optical transmitter 54. The input signal is divided to independently and simultaneously excite first and second optical transmitters 52 and 54. Typically, each optical transmitter is a laser diode but may include other high speed modulated electro-optical devices such as light emitting diodes (LEDs). First optical transmitter 52 transmits the input signal carried on wavelength $\lambda 1$, and second optical transmitter 54 transmits the input signal carried on wavelength $\lambda 2$. The output of second optical transmitter 54 is delayed in optical delay line 56 by a delay time greater than the expected fade duration. Transmitter 50 further includes optical combiner 57 and optical telecscope 58 to transduce the optical signals from the outputs of first optical transmitter 52 and optical delay line 56 into free space optical beams directed in the direction of receiver 60.

Receiver 60 includes optical telescope 62 to transduce the free space optical beams received from transmitter 50 into an optical signal (typically contained in an optical fiber) that is supplied through optional optical amplifier 63 (e.g., erbium doped fiber amplifier) to wavelength demultiplexer 64. Wavelength demultiplexer 64 separates wavelength division multiplex optical signals into an optical signal carried on wavelength $\lambda 1$, and an optical signal carried on wavelength $\lambda 2$. The optical signal carried on wavelength $\lambda 1$ is delayed in optical delay line 66 by the same delay time that was employed in optical delay line 56 of transmitter 50. The delayed optical signal carried on wavelength $\lambda 1$ is detected in optical-to-electrical converter 68, and the optical signal carried on wavelength $\lambda 2$ is detected in optical-to-electrical converter 69. The optical-to-electrical converters may be, for example, photodiodes, avalanche photodiodes, phototransistors or photogates. The detected outputs of converters 68, 69 are combined in diversity combiner 70, and the combined signal is output as SIGNAL OUT.

The optical transmitter and optics of FIG. 2 include a dual channel (or plural channel) arrangement that converts the input signal into redundant optical signals at different wavelengths and optically delays one of the signals by a time greater than the expected fade duration before optically sending two beams (the direct beam at one wavelength and the delayed beam at another wavelength). An optical transceiver optically modulates a signal onto redundant channels at different wavelengths, and one optical signal is optically delayed with respect to the other. Prior art transmission systems do not transmit multiple beams at correspondingly distinct wavelengths where the signal on one beam is optically delayed with respect to the other.

At the receiver, signal levels of the optical signals at wavelengths $\lambda 1$ and $\lambda 2$ are monitored and used to optimally combine the received signals.

Figure 3:
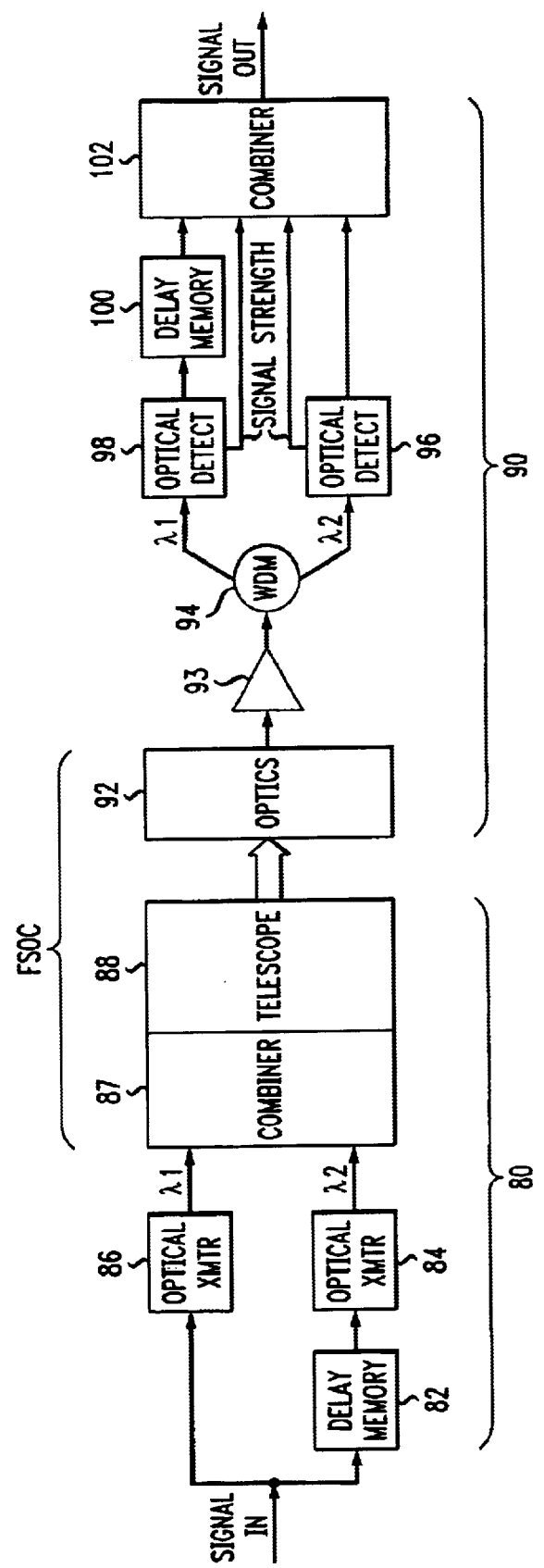
FIG. 3 is a block diagram of a second embodiment of the present invention.

In FIG. 3, a free space optical channel (as in link 30 of FIG. 1) includes transmitter 80 and receiver 90. Transmitter 80 includes delay memory 82, first optical transmitter 86 and second optical transmitter 84. The input signal in an electrical form is simultaneously provided to first optical transmitter 86 and delay memory 82. First optical transmitter 86 produces a first optical signal carried on wavelength $\lambda 1$. Delay memory 82 produces a delayed input signal that is delayed by a delay time greater than the expected fade duration, and the delayed input signal is provided to second optical transmitter 84 to produce a second optical signal carried on wavelength $\lambda 2$. Transmitter 80 further includes optical combiner 87 and telecscope 88 to transduce the optical signals from the outputs of first and second optical transmitters 84 and 86 into free space optical beams directed in the direction of receiver 90. Optical signals at wavelengths $\lambda 1$ and $\lambda 2$ are preferably close in wavelength so that they encounter similar atmospheric propagation characteristics.

Receiver 90 includes optical telescope 92 to transduce the free space optical beams received from transmitter 80 into an optical signal (typically contained in an optical fiber) that is supplied through optional optical amplifier 93 to wavelength demultiplexer 94. Wavelength demultiplexer 94 separates wavelength division multiplex optical signals into an optical signal carried on wavelength $\lambda 1$, and an optical signal carried on wavelength $\lambda 2$. The optical signal from demultiplexer 94 that is carried on wavelength $\lambda 2$ is detected in optical detector 96. The optical signal from demultiplexer 94 that is carried on wavelength $\lambda 1$ is detected in optical detector 98, and the detected signal at the output of optical detector 98 is delayed in delay memory 100. The delayed detected signal at the output of delay memory 100 and the detected signal at the output of optical detector 96 are combined in diversity combiner 102 to form the signal output. The optical detectors may be, for example, a photodiode, an avalanche photodiode, a phototransistor or a photogate.

The optical transmitter and optics of FIG. 3 includes a dual channel (or plural channel) arrangement that generates a delayed electrical signal by a time greater than an expected fade duration with respect to the input signal. The optical transmitter converts both the input signal and the delayed input signal into redundant optical signals at different wavelengths. The redundant optical signals are sent as two beams (the direct beam at one wavelength and the delayed beam at another wavelength). An optical transceiver optically modulates the input signal onto a first wavelength and optically modulates an electrically delayed counterpart of the input signal onto another wavelength. Prior art transcievers do not transmit multiple beams at correspondingly distinct wavelengths where the signal on one beam is electrically delayed with respect to the same signal on the other beam.

In a variant embodiment, an optical telescope of either FIG. 2 or 3 optically separates the beam into plural co-parallel-spaced-apart beams. In FIG. 2, the optical telescope includes a first optical part that combines the output of a first laser source at a first wavelength and the output of each of one or more optical delay lines into a multi-wavelength beam, and a second part to optically separate the multi-wavelength beam into plural co-parallel beams that are spaced apart. In FIG. 3, the optical telescope includes a first optical part that combines the output of all laser sources at diverse wavelengths into a multi-wavelength beam, and a second part to optically separate the multi-wavelength beam into plural co-parallel beams that are spaced apart. This reduces the effects of scintillation. Known optical transceivers do not include a telescope that spatially separates the signal beam for transmission. However, the first part to combine optical signals may be fabricated in known ways from known lenses and other optical components, and the second part to separate the beam may be fabricated in known ways from known optical splitters and other components.

Figure 4:
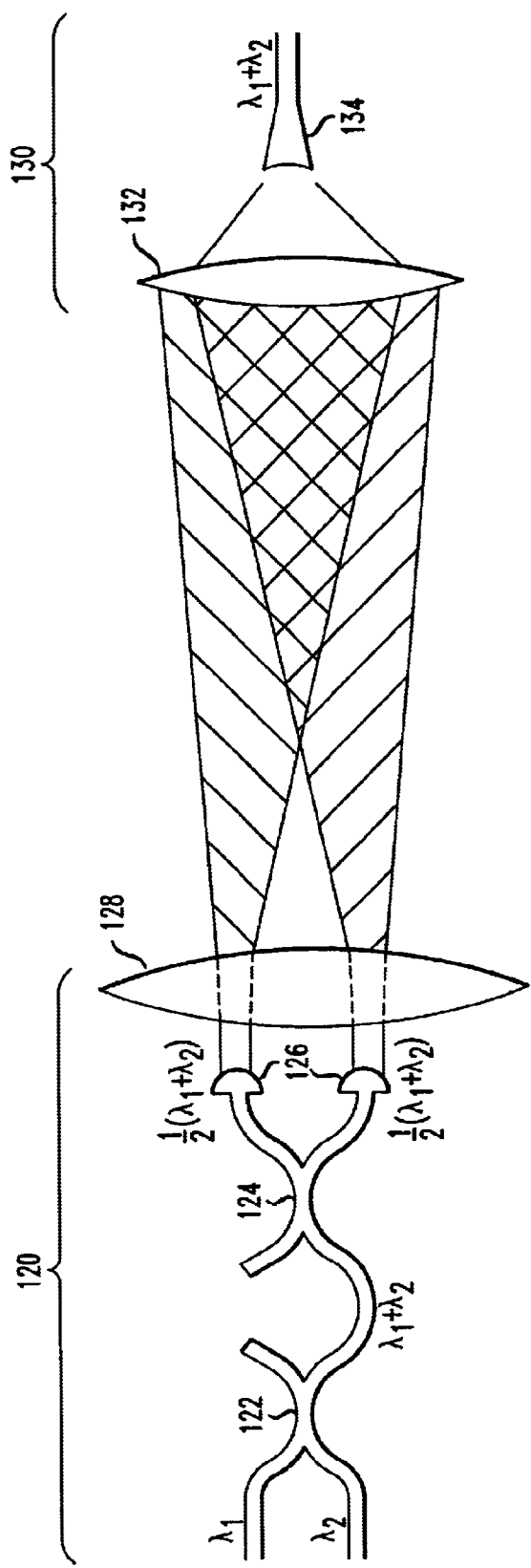
FIG. 4 is a schematic diagram of a telescope according to the present invention.

In FIG. 4, transmit telescope 120 includes two input fibers carrying optical signals at two different wavelengths ($\lambda 1$ and $\lambda 2$). The two optical signals are combined in coupler 122 and the combined signal is divided in coupler 124. From each end 126 of the dividing coupler, a multi-wavelength beam is launched and focused by optical lens 128 on a distant receiving telescope 130. Although the transmit telescope focuses well its beams, there will be some small dispersion of the beam that results in an overlap area. Optical lens 132 of receiving telescope 130 is positioned in the overlap area so that lens 132 receives the superimposed beams. Lens 132 focuses the overlaped beams into conical taper 134 which collects the optical signal as a multimode signal for further processing.

Figure 5:
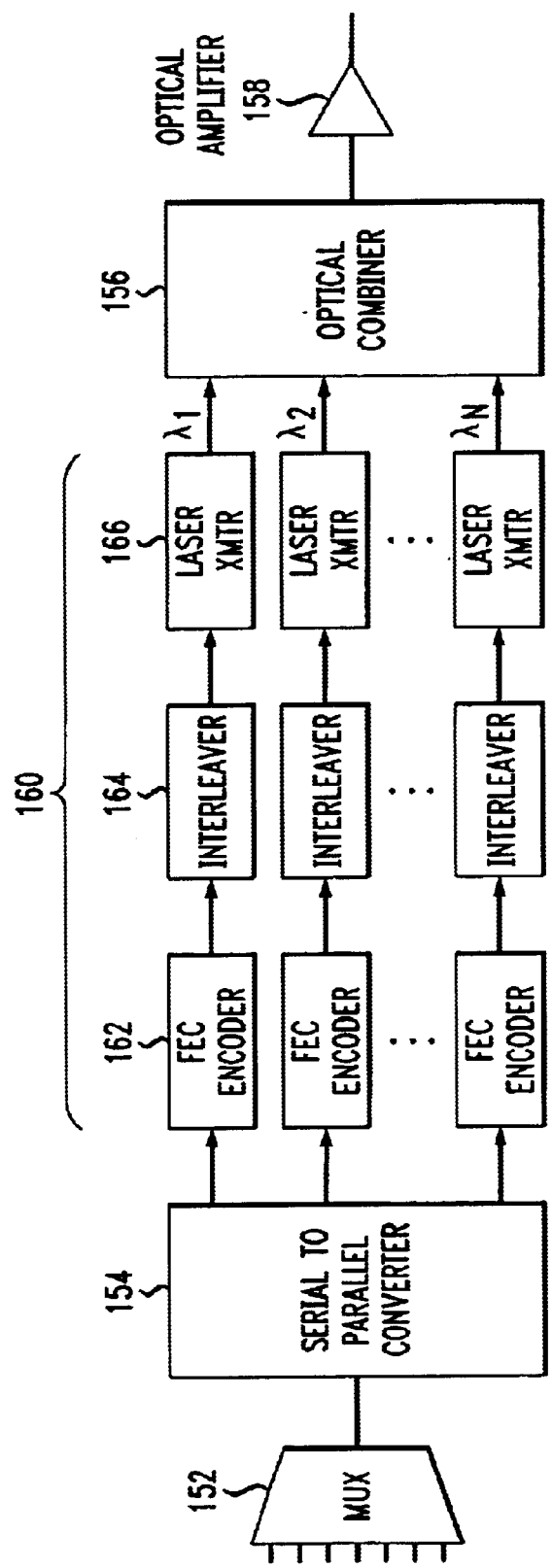
FIG. 5 is a block diagram of an encoder section of a transmitter according to the present invention.

The laser transmitter of FIG. 2 or 3 may be replaced with a wavelength division transmitter of FIG. 5. In FIG. 5, the transmitter includes encoding section 150. Encoding section 150 includes multiplexer 152 to multiplex together plural diverse input signals and provide a serial bitstream at its output. Then, in serial to parallel converter 154 the serial bitstream is converted into plural parallel signals (a predefined number of signals) to be processed. Each parallel signal is processed in parallel section 160 that includes forward error correction encoder 162 (an FEC encoder or other redundance error correction encoder), bit interleaver 164 and a laser transmitter 166 (e.g., a laser diode or other laser source). For example, an output of FEC encoder 162 might be a signal organized in a block made of 8 bytes with each byte having 8 bits. Interleaver 164 might take the first bit of each byte before taking the second bit of each byte. In this way, errors are spread out over the time it takes to transmit the block in order to Awhiten= the effect of an error and make it easier for a FEC code to correct for the error. Each interleaved signal is then converted into an optical signal on a distinct, predefined wavelength and the optical signals are combined in optical combiner 156 (e.g., coupler 122 of FIG. 4), and the combined signal is amplified in optical amplifier 158 (e.g., an erbium doped fiber amplifier, EDFA) before being sent to a transmitter telescope (see FIG. 2 or 3). Prior art does not use this arrangement for an optical transmitter and thus is unable to tolerate deep fades (>30 dB) that last for tens of milliseconds.

Having described preferred embodiments of a novel free space optical communications link (which are intended to be illustrative and not limiting), it is noted that modifications and variations can be made by persons skilled in the art in light of the above teachings. For example, various techniques of sending redundancy information and redistributing information over the time slot for a block of data may be combined to whiten and limit the effects of fading. It is therefore to be understood that changes may be made in the particular embodiments of the invention disclosed which are within the scope and spirit of the invention as defined by the appended claims.

Having thus described the invention with the details and particularity required by the patent laws, what is claimed and desired protected by Letters Patent is set forth in the appended claims.

What is claimed is:

1. A free space optical system comprising first and second terminals, the first terminal including a transmitter to transmit an input signal, the transmitter having:

a plurality of lasers sources, each laser source of said plurality modulating the input signal onto a wavelength that is distinct from a wavelength onto which each other laser source modulates the input signal, said plurality including a first laser source and at least one other laser source;

at least one optical delay line coupled to a respective output of the at least one other laser source; and a telescope that projects an output of the first laser source and an output of each of the at least one optical delay line toward the second terminal.

2. The free space optical system of claim 1, wherein:

the at least one other laser source includes a second laser source; and an optical delay line coupled to the second laser source delays any optical signal passing therethrough by a predetermined time delay.

3. The free space optical system of claim 1, wherein:

the at least one other laser source includes a second laser source;

the first laser source of the transmitter produces a first optical signal at a first wavelength;

the second laser source of the transmitter produces a second optical signal at a second wavelength;

an optical delay line coupled to the second laser source delays the second optical signal by a predetermined time delay;

the second terminal includes a receiver;

the receiver includes a telescope and a wavelength separator coupled to the telescope, the wavelength separator providing a first received signal at the first wavelength and a second received signal at the second wavelength; and the receiver further includes an optical delay line coupled to the wavelength separator to provide a delayed received signal delayed with respect to the first received signal by the predetermined time delay.

4. The free space optical system of claim 1, wherein:

the at least one other laser source includes a second laser source;

the first laser source of the transmitter produces a first optical signal at a first wavelength;

the second laser source of the transmitter produces a second optical signal at a second wavelength;

an optical delay line coupled to the second laser source delays the second optical signal by a predetermined time delay;

the second terminal includes a receiver;

the receiver includes a telescope and a wavelength separator coupled to the telescope, the wavelength separator providing a first received signal at the first wavelength and a second received signal at the second wavelength;

the receiver further includes a first optical to electrical converter coupled to the first received signal;

the receiver further includes a second optical to electrical converter coupled to the second received signal; and the receiver further includes an electrical delay line coupled to the first optical to electrical converter.

5. A free space optical system comprising first and second terminals, the first terminal including a transmitter to transmit an input signal, the transmitter having:

at least one electrical delay line coupled to delay the input signal;

a plurality of laser sources that include a first laser source and at least one other laser source, the first laser source modulating the input signal onto a first wavelength, and the at least one other laser source modulating an output of a corresponding one of said at least one electrical delay line onto a wavelength that is distinct from the first wavelength; and a telescope that projects an output of each of the plural laser sources toward the second terminal.

6. The free space optical system of claim 5, wherein the at least one delay line includes a first delay line to delay the input signal by a predetermined time delay.

7. The free space optical system of claim 5, wherein:

the at least one other laser source includes a second laser source;

the first laser source of the transmitter produces a first optical signal at the first wavelength;

the second laser source of the transmitter produces a second optical signal at a second wavelength;

an electrical delay line coupled to the second laser source delays an output of the second laser source by a predetermined time delay;

the second terminal includes a receiver;

the receiver includes a telescope and a wavelength separator coupled to the telescope, the wavelength separator providing a first received signal at the first wavelength and a second received signal at the second wavelength;

the receiver further includes a first optical to electrical converter coupled to the first received signal;

the receiver further includes a second optical to electrical converter coupled to the second received signal; and the receiver further includes an electrical delay line coupled to the first optical to electrical converter.

8. The free space optical system of claim 5, wherein:

the at least one other laser source includes a second laser source;

the first laser source of the transmitter produces a first optical signal at the first wavelength;

the second laser source of the transmitter produces a second optical signal at a second wavelength;

an optical delay line coupled to the second laser source delays the second optical signal by a predetermined time delay;

the second terminal includes a receiver;

the receiver includes a telescope and a wavelength separator coupled to the telescope, the wavelength separator providing a first received signal at the first wavelength and a second received signal at the second wavelength; and the receiver further includes an optical delay line coupled to the wavelength separator to provide a delayed received signal delayed with respect to the first received signal by the predetermined time delay.

9. A free space optical system comprising first and second terminals, the first terminal including a transmitter having:

an electrical converter to convert a serial bitstream into a plurality of parallel blocks of data;

an FEC encoder, bit interleaver and laser source for each parallel block of data, each laser source modulating the interleaved FEC encoded parallel block of data on a wavelength distinct from a wavelength of each other laser source; and an optical combiner to combine an optical signal from each laser source.

10. The free space optical system of claim 9, wherein the transmitter further includes a multiplexer to combine plural input signals into the serial bitstream.

11. The free space optical system of claim 9, further comprising a telescope that projects an output of the combiner toward the second terminal.

12. The free space optical system of claim 9, wherein:

the plural laser sources for each respective block including a first laser source and at least one other laser source;

the transmitter further includes at least one optical delay line coupled between a respective output of the at least one other laser source and the optical combiner; and the transmitter further includes a telescope that projects an output of the first laser source and an output of each of the at least one optical delay line toward the second terminal.

* * * * *